United States Patent Office 3,194,771
Patented July 13, 1965

3,194,771
CATALYST COMPOSITION CONSISTING OF IRON OXIDE, MOLYBDENUM OXIDE AND CHROMIUM
Pierre Vasseur, Vermelles, France, and Kristian Sondergaard, Hellerup, Denmark, assignors to Houilleres du Bassin du Nord et du Pas-de-Calais, Douai, Nord, France, a French public establishment, and Haldor Topsoe, Hellerup, Denmark, a Danish society, and Baunegaardsvej-Kaltenbach & Cie, Paris, France, a French society
No Drawing. Filed Apr. 16, 1962, Ser. No. 187,922
Claims priority, application France, Apr. 18, 1961, 859,031
2 Claims. (Cl. 252—470)

This invention is concerned with catalysts for the preparation of formaldehyde by the oxidation of methyl alcohol.

In our application S.N. 187,923 of even date we have described a ferric oxide-molybdenum oxide catalyst for use in the production of formaldehyde by the catalytic oxidation of methanol which possesses a number of characteristics that make it better than known catalysts. This catalyst is characterised by having a molar ratio of $MoO_3:Fe_2O_3$ of from 3:1 to 8:1, a specific surface of from about 4 to about 15 m.$^2$/g. and a pore volume of from about 0.15 to about 0.60 ml./g.

It has been found that the activity of this catalyst decreases after it has been in use for some time and, at the same time, there is a reduction in the specific surface and pore volume.

It has also been found that when a co-precipitated catalyst of the $Cr_2O_3.3MoO_3$ type is used for the oxidation of methanol, its specific surface increases considerably during the first 80 hours of operation, and its catalytic activity increases considerably during this time while its selectivity decreases. In practice, chromium molybdate cannot be used in the oxidation of methanol since its selectivity is too low and decreases during operation. We have now found that if chromium molybdate, the specific surface of which increases during operation, is combined in a suitable proportion with ferric molybdate, the specific surface of which decreases during operation; an improved catalyst from the point of view of stability is obtained.

In addition to stabilizing the specific surface of the catalyst, the presence of chromium can also bring about other improvements if certain conditions are met; in this connection the action of the chromium depends on the state of the catalyst before it is used.

(1) If the fresh catalyst (prior to use) has suitable specific surface and pore volume, the presence of a suitable quantity of chromium, in addition to stabilizing the specific surface, provides some stabilization of pore volume. The activity and selectivity of the catalyst therefore remain high.

(2) If the catalyst has been prepared by a method giving a catalyst of a relatively low specific surface, the presence of a suitable quantity of chromium in the catalyst has the effect not only of increasing the specific surface during operation, but also, to some extent, the pore volume. This leads to a considerable increase in activity and only to some reduction in selectivity, the reduction in selectivity being low as compared with the increased conversion rate provided. In operation, the specific surface approaches a maximum value which depends upon the chromium content and the catalyst temperature.

The chromium content of the ferric oxide-molybdenum oxide catalyst according to the invention is preferably from 0.05 to 1.0% by weight, but other chromium contents can be used to give useful results. The proportion of chromium present in the catalyst should be chosen in accordance with the operating temperature of the formaldehyde preparation process, the optimum proportion being greater as the operating temperature is increased to off-set the increased sintering caused by the increased temperature.

The catalyst can, in general, be prepared by the process described in our said patent application. A water-soluble ferric salt is reacted with a water-soluble molybdate. In aqueous solution; the molar ratio of the reactants, expressed as $MoO_3:Fe_2O_3$, is not very critical and can be from 3:1 to 8:1. Any ferric salt, wether organic or inorganic, can be used, for example $FeCl_3$ or $Fe(NO_3)_3$, provided that the anion does not form stable complexes with the ferric cation in aqueous solution as, for example the hydrofluoric and citric anions do. Similarly, any soluble molybdate can be used provided that the cation does not form difficulty soluble compounds with the anion of the ferric salt, since purification of the catalyst by washing would be rendered difficult.

The chromium can be introduced into the catalyst by any suitable means, for example, by replacing some of the ferric salt by an organic or inorganic chromic salt, such as $CrCl_3$, provided that the anion does not form stable complexes with the ferric and chromic cations in aqueous solution. The mechanical strength of the catalyst is not impaired by the introduction of such small quantities of chromium.

Before the catalyst is ready for use, it must be calcined by heating it at a suitable rate to a temperature near the working temperature of the catalyst.

The mechanical strength (axial) of such a catalyst is very high. It is usual for a calcined catalyst, in the form of granules measuring 2.8 x 2.0 mm., to have a strength of 160 kg./cm.$^2$, and possibly of up to 350 kg./cm.$^2$.

The catalyst according to the invention has an improved and stabilized activity and can be processed into compressed pastilles of satisfactory mechanical strength. If the specific surface and pore volume of the fresh catalyst are less than hereinbefore mentioned, the presence of chromium in the catalyst helps to increase these values during operation.

In order that the invention may be more fully understood, the following examples, of which Example I is by way of comparison, are given by way of illustration only.

*Example I*

Three solutions A, B and C were prepared. For solution A, 200 g. of ammonium paramolybdate were dissolved in 2 liters of water and the pH was adjusted to 5 with hydrochloric acid. For solution B, 100 g. of $FeCl_3.6H_2O$ were dissolved in two liters of water and the pH was adjusted to from 0.5 to 1.0 with hydrochloric acid. For solution C, 10 g. of cellulose powder were suspended in 1 liter of water and the pH was adjusted to from 0.5 to 1.0 with hydrochloric acid.

The three solutions were heated to 90° C. and solutions A and B were poured into suspension C with considerable agitation.

The solution was separated from the precipitate by hot filtration after the mixture had stood for 2 hours and the filter cake was introduced into a beaker, mixed with 3 liters of water and then refiltered. The filter cake was dried at ambient temperature for 1 day, at 70° C. for 1 day and then at 110° C. for another day.

The product was crushed and screened. The fraction between screen meshes 25 and 120 (0.1–0.7 mm.) was dried at 110° C. for a further day, 1½% of graphite was added to it and the mixture was tabletted. The yield of catalyst was about 165 g.

The product was given further drying treatment, first at 220° C. for 16 hours and then at 280° C. for 3 hours, to increase density. 100 ml. of pastilles were placed in a stainless steel tubular reactor of 20 mm. internal diameter, provided with an axial Pyrex glass sheath having an external diameter of 3.7 mm. and immersed in a bath consisting of molten sodium and potassium nitrates. The height of the catalyst layer was 30 cm. The catalyst was calcined at 350° C. for 27 hours in an air stream and a gaseous mixture of air and methanol was then introduced. For a spatial velocity (S.V.) of 12,000 h.$^{-1}$, a temperature of 280° C. in the salt bath and with 6.5% by volume of $CH_3OH$ in the feed gas, the total conversion rate was 96% and the selectivity was 94%, that is 90% of the methanol introduced was converted into formaldehyde. The spatial yield (S.T.Y.) was 0.95 kg. of formaldehyde (equal to 2.6 kg. of formol) or 36.5% per litre of catalyst per hour.

The hottest part of the catalyst remained below 440° C. throughout the test. The position of the hottest part in the catalyst bed was very stable for the first 300 hours of operation, but during the next 400 hours the hottest part moved from 10 cm. below the top of the catalyst layer to 15 cm., indicating some inactivation of the catalyst in the hottest zone. After about 1200 hours operation the conversion and selectivity were the same, but the salt bath temperature had to be increased by a few degrees.

The specific surface of the catalyst was 11.4 m.$^2$/g. before operation and, after operation, its average value in the layer was 3 m.$^2$/g. The decrease in pore volume during the same period was from 0.31 to 0.13 ml./g.

*Example II*

Two solutions, A and B, were prepared. For solution A, 210 g. of $(NH_4)_6Mo_7O_{24}.4H_2O$ were dissolved in 2 liters of water and the pH of the solution was adjusted to 4.4 with hydrochloric acid. For solution B, 90 g. of $FeCl_3.6H_2O$ and 9.6 g. of $CrCl_3.6H_2O$ were dissolved in two liters of water, 20 g. of cellulose powder were added, and the pH of the solution was adjusted to 0.8 to 1.2 with hydrochloric acid.

The two solutions were heated to 92° C., and solution A was poured slowly into solution B with strong agitation. The final pH was from 0.8 to 1.2 and the final temperature was 85° C. The mixture was filtered the next day after the suspension had been agitated and the filter cake was washed on the filter. It was then placed in a beaker where it was mixed with 2 liters of water and refiltered.

The filter cake was then dried at ambient temperature for 1 day, at 70° C. for 1 day and at 110° C. for 1 day. The product was then crushed and screened. The fraction between screen meshes 25 and 120 (0.1–0.7 mm.) was dried at 110° C. for 1 day. 0.5% of stearic acid was added and the mixture was compressed into pastilles 3 mm. in diameter and 2 mm. high. The pastilles were calcined in a slight draught at a temperature of 450° C. for 3 hours.

At the spatial velocity of 20,000 h.$^{-1}$ with a mixture of air and methanol containing 6.5% by volume of methanol and at a temperature of from 350 to 420° C. in the catalyst, catalyst activity, as defined by the average of the methanol conversion rates for 16 tests, was 98.4 mol percent and the selectivity was 92.2 mol percent. It follows that 90.6% of the methanol was converted into formaldehyde.

The specific surface of the catalyst was 6.3 m.$^2$/g. before operation and 7.3 m.$^2$/g. after 575 hours operation. During the same time, the increase in pore volume was from 0.32 to 0.36 ml./g. The chromium content of the catalyst as found by a radiochemical method was 0.2% of chromium.

*Example III*

A catalyst prepared as described in Example II was dried in a porcelain capsule in a furnace, the temperature gradually being increased from 20 to 450° C. in the course of one hour and 45 minutes.

200 ml. of pastilles were placed in the reactor described in Example I. The height of the catalyst layer was 58 cm. At spatial velocity of 12,000 h.$^{-1}$, with a temperature of 240° C. in the salt bath and with 6.5% by volume of methanol in the feed gas, the total conversion rate was 99.2 mol percent and the selectivity was 93.1 mol percent, that is 92.3 mol percent of the methanol introduced was converted into formaldehyde. After about 2000 hours, the conversion rate and selectivity were still the same. The test was stopped at this time but the life of the catalyst was doubtless much longer.

The charge loss through the catalyst layer increased from 200 mm. of mercury at the beginning to 270 mm. of mercury after 2060 hours of operation at a spatial velocity of 10,000 h.$^{-1}$; this is a relatively small increase.

The hottest part of the catalyst was below 430° C. throughout the test, and its position varied from 25 cm. at the start to 26 cm. after 2060 hours of operation, that is there was very little inactivation of the catalyst in the hottest zone.

The specific surface changed from 6.3 m.$^2$/g. before the test to from 5.5 to 11.5 m.$^2$/g. after the test, depending upon the position in the layer; being 5.5 m.$^2$/g. in the hottest zone and 11.5 m.$^2$/g. in the coolest zone. The pore volume changed from 0.32 ml./g. before the test to 0.36–0.32 ml./g., depending upon the position in the layer.

Clearly, therefore, the specific surface and pore volume of the chromium-containing catalyst according to the invention remains substantially constant, whereas in a similar catalyst without chromium (see Example I) there is a very considerable reduction of the specific surface and pore volume.

*Example IV*

The catalyst described in this example had a chromium content of 0.43% and its initial specific surface was relatively low. The example shows how the surface increased considerably during operation and, since the chromium content is greater than in the catalyst described in Example II, the surface is stabilized at a greater value than in Example II.

Three solutions, A, B and C, are prepared in three beakers. For solution A, 105 g. of $(NH_4)_6Mo_7O_{24}.4H_2O$ were dissolved in 1 liter of water and the pH of the solution was adjusted to 4.5 with hydrochloric acid. For solution B, 45 g. of $FeCl_3.6H_2O$ and 9.6 g. of $CrCl_3.6H_2O$ were dissolved in 1 liter of water and the pH of the solution was adjusted to 1.0 with hydrochloric acid. For solution C, the pH of 0.5 liter of water was adjusted to 1.0 with hydrochloric acid.

Precipitation was carried out as described in Example II except that only 0.250 liter of water was used for washing. The product was crushed and screened and the 1 to 2 mm. fraction was tested as catalyst.

When tested under the condition of Example II, the average of the methanol conversion rates for eight tests was 99.9 mol percent and the selectivity was 92.4 mol percent, that is 92.3% of the methanol was converted into formaldehyde.

The specific surface of the catalyst was 6.3 m.²/g. before the test and 11.4 m.²/g. after 372 hours of operation. The pore volume remained substantially constant during the same period, decreasing from 0.55 ml./g. before the test to 0.53 ml./g. after the test, that is the change in pore volume was less than uncertainty of measurement.

What we claim is:

1. An unsupported ferric oxide-molybdenum oxide catalyst for use in the production of formaldehyde by the catalytic oxidation of methanol, having a molar ratio of $MoO_3:Fe_2O_3$ of from 3:1 to 8:1 and containing from 0.05 to 1% by weight of chromium.

2. A catalyst according to claim 1 which has a specific surface of from about 4 to 15 m.²/g. and a pore volume of from about 0.15 to 0.60 ml./g.

References Cited by the Examiner
UNITED STATES PATENTS

| | | | |
|---|---|---|---|
| 2,812,309 | 11/57 | Allyn et al. | 252—470 |
| 2,851,400 | 9/58 | Myers et al. | 252—470 X |

FOREIGN PATENTS 561,468  8/58  Canada.

MAURICE A. BRINDISI, *Primary Examiner.*